United States Patent [19]
Chadwick

[11] 3,946,971
[45] Mar. 30, 1976

[54] LOAD LIFTING SYSTEM
[76] Inventor: Russell D. Chadwick, 6125 SW. 152nd Ave., Beaverton, Oreg. 97005
[22] Filed: Aug. 9, 1974
[21] Appl. No.: 496,106

[52] U.S. Cl............................ 244/137 R; 212/71
[51] Int. Cl.²........................................ B64D 1/08
[58] Field of Search .......... 212/71; 244/137 R, 3, 2

[56] References Cited
UNITED STATES PATENTS

| | | | |
|---|---|---|---|
| 3,017,138 | 1/1962 | Flint........................... | 244/3 |
| 3,112,900 | 12/1963 | Yost............................ | 244/3 |
| 3,856,236 | 12/1974 | Doolittle..................... | 244/2 |

FOREIGN PATENTS OR APPLICATIONS
751,766   1/1967   Canada................................. 212/71

Primary Examiner—Trygve M. Blix
Assistant Examiner—Stephen G. Kunin
Attorney, Agent, or Firm—Klarquist, Sparkman, Campbell, Leigh, Hall & Whinston

[57] ABSTRACT

A load lifting system includes a platform suspended beneath a helicopter and provided with an engine for supplying thrust in a vertical direction. The platform engine is controlled to lift the load suspended below the platform while the aircraft supplies the lift for supporting the platform and engine.

13 Claims, 5 Drawing Figures

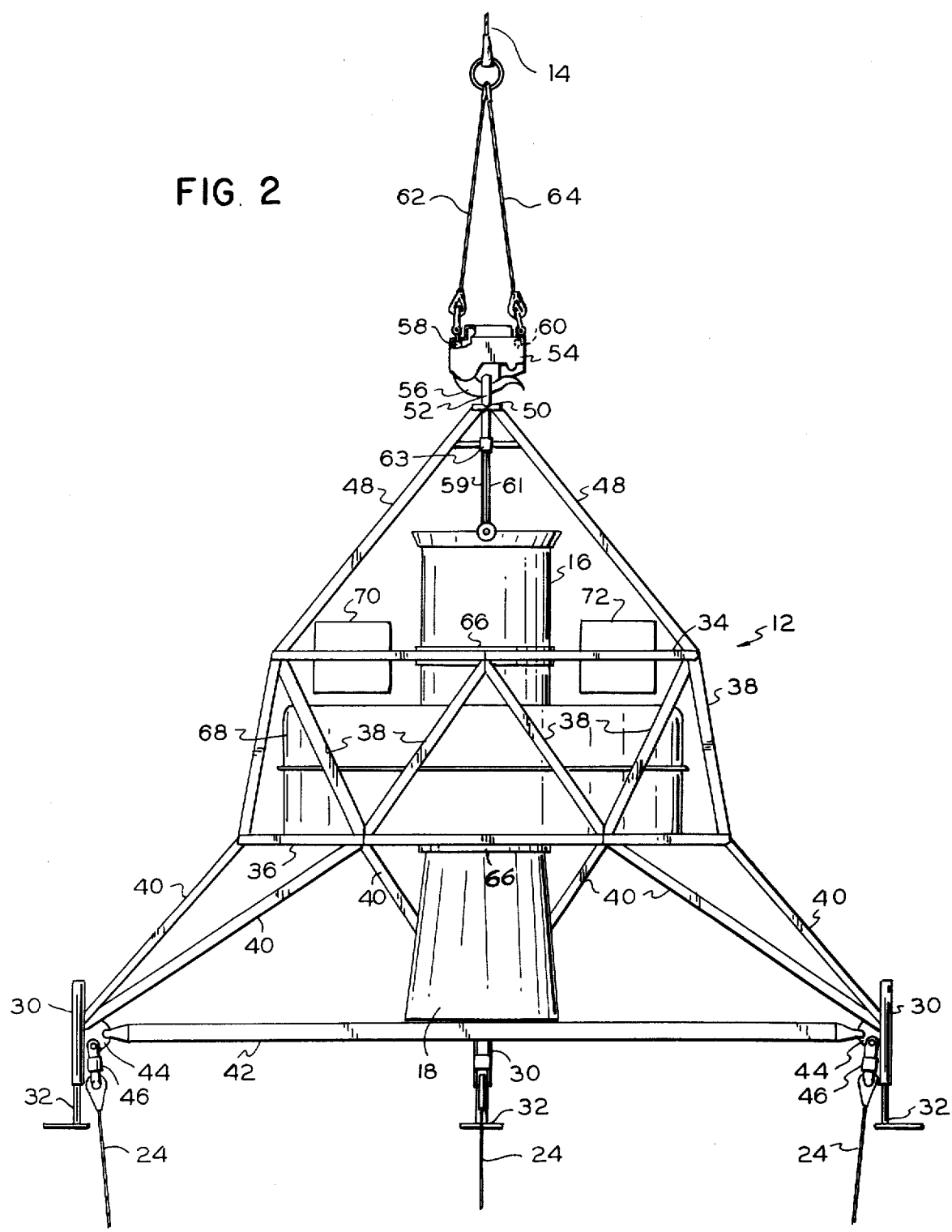

3,946,971

LOAD LIFTING SYSTEM

BACKGROUND OF THE INVENTION

The present invention relates to aircraft cargo systems and particularly to a method and apparatus for carrying a load from beneath an aircraft.

Aircraft are employed extensively for carrying heavy cargo from one location to another, expecially in areas relatively inaccessible to cargo carrying land vehicles. The load is conveniently supported from a cable sling attached to the cargo hook of the aircraft and by means of which the load is lifted and deposited at a location remote from the point of pickup. However, the aircraft are limited in their load carrying ability and may support a few thousand pounds in addition to the weight of the aircraft itself.

Proposals have been made regarding flying a plurality of helicopters in tandem and/or abreast for lifting a load heavier than could be carried by a single helicopter. Not only does this necessitate the expense of the additional aircraft, but also frequently necessitates considerable alteration of the additional aircraft to provide either a structural connection or extensive electronic control between aircraft.

SUMMARY OF THE INVENTION

According to the method and system of the present invention, a single aircraft, preferably a helicopter or balloon, is adapted to carry at least an appreciable portion of the weight of a platform suspended beneath the aircraft, said platform being provided with an engine or engines for supplying thrust in a generally vertical direction. The load or cargo to be carried is connected to the aforementioned platform, e.g., by being suspended therefrom, and an engine or engines on the platform supply the thrust for carrying the load. In the particular example, the aircraft carries a 4,000 pound platform including the weight of one or more jet engines mounted thereupon, and the platform engine or engines lift a 17,000 pound load suspended therebelow. The engine or engines mounted upon the platform are controlled to supply less lift than would lift the platform and load independently, and in a particular example the platform engine or engines are controlled in response to the weight or pull measured beneath the aircraft.

In this system, the aircraft need not be altered other than by the provision of an aircraft terminal providing the pilot with instrumentation and auxiliary control of the engine or engines mounted on the platform. The flying and maneuvering of the system is accomplished in a conventional manner, with the aircraft guiding the system and load to its eventual destination. The platform and engine can be relatively uncomplicated, and are less expensive than the cost of an additional, load-sharing conventional aircraft.

It is accordingly an object of the present invention to provide an improved method and system for raising and transporting a cargo by means of an aircraft.

It is another object of the present invention to provide an improved method and apparatus for lifting a relatively large and heavy load by means of a helicopter or similar aircraft.

It is a further object of the present invention to provide an improved system and method for increasing the load handling capabilities of a conventional helicopter, beyond its normal rated load.

It is another object of the present invention to provide a relatively economical method and system for lifting a heavy load by means of helicopter or similar aircraft.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the acompanying drawings wherein like reference characters refer to like elements.

DRAWINGS

FIG. 2 is a side view of a platform portion of the FIG. 1 system;

DETAILED DESCRIPTION

Figures 1, 5:
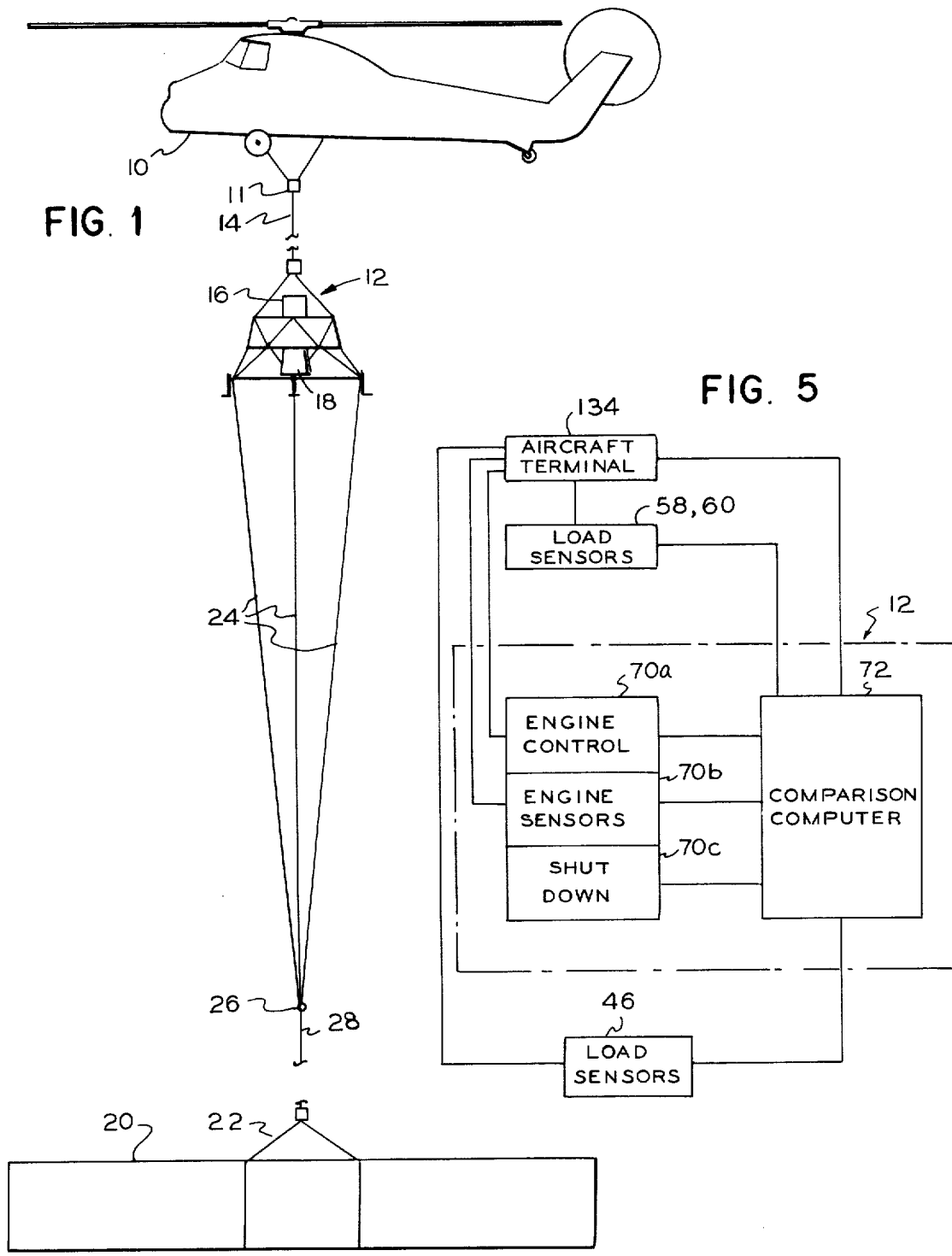
FIG. 1 is an overall side elevational view of a load carrying system according to the present invention.
FIG. 5 is a block diagram of control circuitry employed with the FIG. 1 system.

Referring to the drawings and particularly to FIG. 1, an aircraft comprising in this example a helicopter 10 is provided with a load hooking device 11 and has suspended therebeneath a movable platform 12 which is attached to the aforesaid hooking device via an intermediate cable 14. The weight of the platform 12 including a jet engine 16 mounted thereupon is arranged to be within the load carrying capabilities of the helicopter 10. Jet engine 16 is oriented to provide thrust in a vertical direction, i.e., the exhaust end 18 of the jet engine is directed downwardly and provides thrust for lifting load 20. Load 20 is connected to platform 12 by means of a sling or cable arrangement including cables 22 attached to the load, cables 24 extending between the legs of the platform 12 and a hook or junction 26 located some distance below the platform, and an intermediate cable 28. The spacing, in flight, between the bottom of the helicopter and the top of platform 12 is typically but not limited to a distance of 30 feet, while the spacing between the load and the bottom of platform 12 is typically but not limited to a distance of from 30 to 200 feet. The construction of platform 12 is illustrated in greater detail in FIG. 2.

Referring to FIG. 2, the platform 12 is of tripod construction including three legs 30 provided at their lower extremity with vertically adjustable pads 32 adapted for supporting the platform 12 on the ground and spacing the exhaust end of the jet engine from the ground. The central portion of the platform comprises an upper hexagonal ring 34 formed of structural steel members, and a similarly constructed but slightly larger hexagonal ring 36 located below and in general alignment with ring 34 while being joined thereto by means of intermediate struts 38 angularly disposed between the corners of the upper and lower rings. Leg supports 40 are welded in pairs to respective legs 30 and extend upwardly and inwardly to adjacent corners of ring 36. Three cross braces 42 are joined to brackets 44 mounted on the sides of legs 30, and these cross braces form a lower triangular configuration between the respective legs. Brackets 44 provide a means of connection for cables 24 via load sensors 46 adapted to support the entire weight of the load so these sensors can measure the weight according to the strain produced longitudinally in the sensors. Steel constructed "load cell" sensors of this type are available from Chadwick, Incorporated, 4375 S.W. 142nd Ave., Beaverton, Ore., as components of electronic weighing systems, models C–40 through C–60 which are designed to provide digital output readings. The sensors are selected according to the load limits desired.

The upper portion of the platform 12 comprises three structural steel support members 48 extending between corners of upper ring 34 adjacent to leg 30 and a common central ring member 50 to which an eye 52 is welded for receiving jettison hook 54. Jettison hook 54 is of a known construction and includes a hooking member 56 extending through eye 52, which member is remotely controllable from the cockpit of the aircraft for jettisoning the platform 12 under emergency conditons. The jettison hook 54 in the present instance is provided with load sensors 58 and 60 by means of which the jettison hook 54 is supported from cable links 62 and 64 joined to cable 14.

The platform 12 supports the jet engine 16, the latter being provided with support flanges 66 which are joined to upper and lower rings 34 and 36 respectively of the platform by means of structural decks extending horizontally across the said rings 34 and 36. In addition, the lower ring 36 supports an annular fuel tank 68 disposed in surrounding relation to the jet engine and carrying the jet fuel for operating the same. Upper ring 34 supports jet engine control apparatus 70 as well as control computer apparatus 72 which is hereinafter more fully described and which operates for controlling the jet engine to support the weight of the load 20 on a continuous basis when the system is in flight.

Emergency engine shutdown inlet covers 59 and 61 are pivotally attached at diametrically opposite sides of the inlet of engine 16, and are normally disposed in their upraised position as shown. In the case of emergency, as hereinafter more fully indicated, the covers are unlatched by latching device 63 and close the engine inlet.

Figure 3:
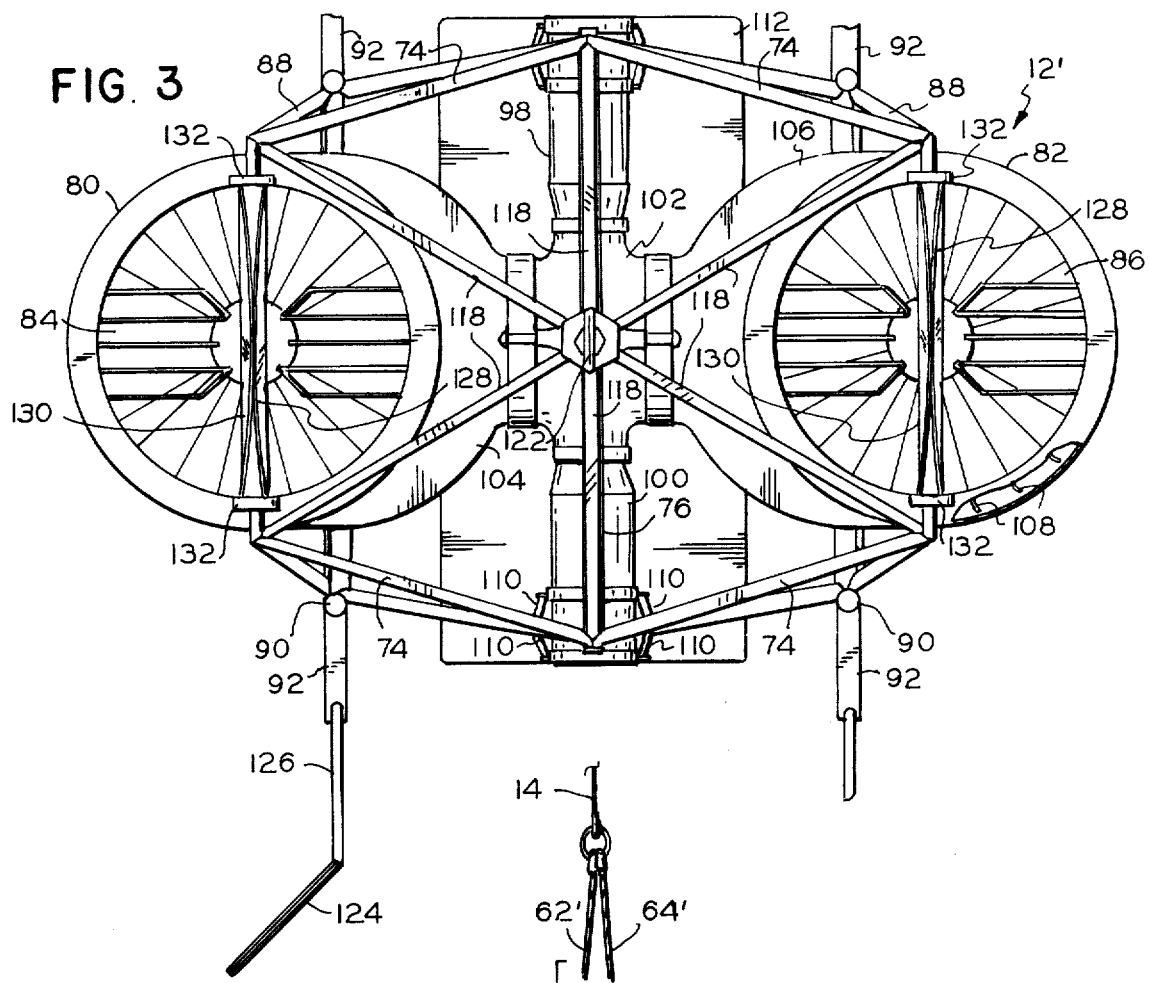
FIG. 3 is a plan view of an alternative and preferred platform for use with the FIG. 1 system.
Figure 4:
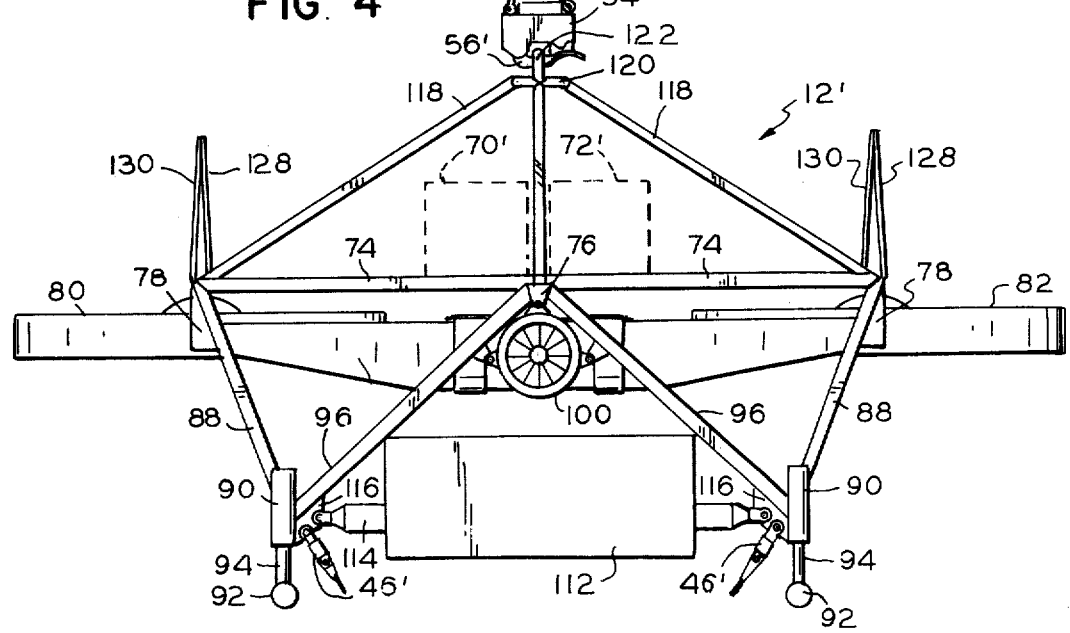
FIG. 4 is a side view of the FIG. 3 platform.

An alternative and preferred platform 12' is illustrated in FIGS. 3 and 4, wherein similar reference numerals refer to equivalent elements in the previous drawings. The platform includes structural steel outer frame members 74 extending from both ends of a structural cross bar 76 to support plates 78 secured to diametrically opposite sides of a pair of circular duct housings 80 and 82 supporting counter-rotating lift fans 84 and 86 respectively. The platform further includes downwardly extending struts 88 disposed between the plates 78 and four corner legs 90 attached in pairs to skids 92 by intermediate rods 94. Additional struts 96 are located between the cross bar 76 and the legs 90.

Supported below cross beam 76 are first and second jet engines 98 and 100 having their inlet ports located proximate the extremity of beam 76 and their exhaust parts joined by means of common passage 102 for connecting the jet output to plenum chambers 104 and 106, respectively associated with lift fans 84 and 86. The jet engines are also supported from struts 96 via brackets 110. The plenum chambers communicate to the duct housings 80 and 82 which contain impeller means 108 having a driving connection with the fans 84 and 86. The jet engine and lift fan combination is of a known type. Lift fans are advantageous because they produce large amounts of thrust with no hot gases at low exhaust velocities, low noise levels, and low fuel consumption. Also, in the construction shown, both fans can be driven by both jet engines, or by either engine in the event of an engine outage.

The platform 12' is further supplied with a fuel tank 112 disposed between pairs of legs 90 and supported by means of members 114 connected to leg brackets 116. Leg brackets 116 also provide means for engaging weight sensors 46' which may be substantially the same as sensors 46 in FIG. 2. An upper portion of the platform comprises six upper support members 118 joined at hexagonal ring 120 and extending to respective ends of outer frame members 74. The hexagonal ring 120 is welded to eye 122 for receiving the hook member 56' of jettison hook 54' which may be of substantially the same construction as jettison hook 54 in FIG. 2. It similarly includes weight sensors (not shown in FIG. 4) attached to a pair of cables 62', 64' joined to the main cable 14.

The platform 12' may additionally include an antispin rudder 124 located in a vertical plane and joined to a support rod 126 extending angularly upwardly from skid 92. An additional rudder or rudders may be added as desired.

Shutdown covers 128 and 130, which are semi-circular in configuration, are hingedly attached to diametrically opposite points proximate the upper sides of housings 80 and 82. These shutdown covers are normally maintained in their upward position as shown, but are automatically released by means of latches 132 in case of emergency, as hereinafter more fully described.

The block diagram of FIG. 5 illustrates the control and monitoring system employed in accordance with the present invention. In this diagram, the reference numerals in general refer to similarly numbered elements hereinbefore described. Load sensors 46 and 58, 60 are connected by electrical leads which may be disposed along support cable 14 to a terminal board 134 in the aircraft for indicating the load carried by the aircraft, and the load carried beneath the platform 12. Thus, the strain values for sensors 58, 60 are added, and the strain values from load sensors 46 are separately added, with these respective values preferably being registered digitally in the aircraft cockpit by means of electronic weighing systems, previously mentioned. In addition, engine control 70a and engine sensors 70b are connected to aircraft terminal 134 in the cockpit to provide the pilot with conventional jet engine indications such as tail pipe temperature, RPM, oil pressure, fuel pressure and the like. In addition, ignition and other jet engine controls are provided on the aircraft terminal panel for starting the jet engine or jet engines and providing emergency manual override. Control apparatus 70a, 70b and 70c is located on the platform 12 or 12'.

The comparison computer 72 also located on the platform compares weight, as detected by sensors 58, 60, with a standard value and provides an output to engine control 70a in the event the detected load on cable 14 is greater than the predetermined value. In a given instance it may be desired that the aircraft lift a weight of 4,000 pounds and, in such case, when the sensors 58, 60 detect a weight greater than 4,000 pounds, the comparison computer 72 provides an output to engine control 70a for adding power to the jet engine or engines for lifting the load 20 below platform 12 or 12'. Feedback from engine sensors 70b indicate to comparison computer 72 that the control order has been carried out, and in the event of malfunction, a warning is provided to the pilot via aircraft terminal 134. The comparison value for comparison computer 72 is desirably set equal to the weight of platform 12 or 12' including the engine or engines thereof, and may be adjustable to compensate for consumable fuels. Consequently, comparison computer 72 will detect the weight of the additional load suspended from the platform 12 or 12'. As the helicopter begins to lift, the load sensors 58, 60 tell the comparison computer 72 to add power to the jet engine or engines until the load 20 is lifted and supported from platform 12 or 12'. The load 20 can be much greater than the load carrying capabilities of the aircraft itself.

In a typical case, a 17,000 pound load is designed to be lifted by the platform, while the weight of the platform itself including the engine facility is lifted by the helicopter. The helicopter's share of the load is just the weight of platform and engine, which is about 4,000 pounds and well within the design capacity of the particular helicopter. The load sensors 58, 60, the comparison computer 72, and the engine control 70a operate as a conventional servomechanism system for maintaining the correct platform lift for lifting the load, without providing greater lift than specified. While, ideally, the helicopter lifts the platform, and the platform lifts the load, it will be understood that digression can be made from these exact values without departing from the present invention. Thus, the jet engine or engines are controlled to carry at least a substantial portion of the weight of the load 20, while at least a substantial portion of the weight of the platform is carried by the helicopter. In any case, the platform engine or engines are controlled to provide less thrust than would lift the platform and load in the absence of the helicopter. Consequently, the helicopter is the guiding force in flight for transferring the platform and load from one location to another.

At the unloading point, the load is lowered to the ground by the aircraft. When the load touches the ground, load sensors 58, 60 register the decrease in overall weight and as a result the comparison computer 72 reduces power to the jet engine or engines via engine control 70a until the entire load is released, at which time such engine or engines are in an idling condition hanging below the helicopter.

A hook at a location indicated by reference numerals 26, or a hook therebelow, also comprises a jettison hook of the same type illustrated at reference numerals 54 and 54' in FIGS. 2 and 3. Such a hook, e.g., at the location indicated by reference numeral 26, is actuated by comparison computer 72 in the event an excessive load is indicated by load sensors 58, 60. Thus, in the above example where the aircraft's share of the load is indicated as 4,000 pounds, if the load should rise to 5,000 pounds indicating inability on the part of the platform engine or engines to lift the load therebelow, the jettison hook at 26 is actuated for jettisoning load 20. Also, such hook as well as jettison hook 54 or 54' can be controlled from the aircraft cockpit for manual jettisoning.

Furthermore, comparison computer 72 receives an input from load sensors 46 as well as from load sensors 58, 60. If the load below the platform as detected by load sensors 46 quickly drops to a value less than the load above the platform indicated by load sensors 58, 60, then comparison computer 72 causes fuel shutoff via engine control 70a, together with actuation of shutdown control 70c. Shutdown control 70c actuates latch 63 in FIG. 2 for closing inlet covers 59 and 61 to jet engine 16 in FIG. 2, or alternatively operate latches 132 in FIG. 3 for releasing shutdown covers 128 and 130 of the lift fans. Thus, operation of the engine or engines on platform 12 or 12' is immediately curtailed as in the case of complete loss of load so as to prevent an upward movement by the platform 12 or 12'. At the same time, a jettison hook at 26 is suitably actuated to prevent possible immediate reassumption of the load. This foregoing emergency procedure is brought into play only in the case of a nearly instantaneous drop in weight as determined by shortness of elapsed time in comparison computer 72, and is intended to provide emergency shutdown of the platform engine or engines in the event the load is inadvertently dropped or falls due to a sling or cable failure or the like. This emergency shutdown feature does not take effect during normal loading and unloading operations.

The engine shutoff brought about by curtailing fuel supply via engine control 70a and the operation of shutdown control 70c also takes place when the excessive load on the helicopter, e.g., greater in value than 5,000 pounds, is detected by load sensors 58, 60. Thus whenever load 20 is jettisoned as described above, the lifting operation on the engine or engines on the platform 12 or 12' is desirably immediately curtailed.

Although analog computing apparatus can be employed for comparison computer 72, it will be appreciated that comparison computer 72 advantageously employs digital circuitry, with load sensors 58, 60 and 46 providing signals which are converted to digital values for operation and display as in the case of the aforementioned electronic weighing systems. In such case, the comparison between a given load value and another load value, or the comparison between a load value and a predetermined fixed value, is provided by simple subtraction or complementary addition.

In general operation, the cables illustrated in FIG. 1 are connected between the aircraft and platform with at least the platform being located upon the ground. The jet engine or engines in the platform are suitably started and the aircraft is piloted to an airborne location over the platform. The aircraft then lifts the platform with the jet engine or engines idling. Alternatively, since the aircraft can carry the weight of the platform and engine or engines, the latter may be started after being lifted by the aircraft. The aircraft then moves to a position over the load 20 and the load is secured or hooked to cabling beneath the platform. The aircraft then begins to lift the platform together with the load therebelow, and the sensors 58, 60 provide an input to the comparison computer 72 for causing the addition of power to the jet engine or engines until the load is lifted and supported by the platform. At the unloading point, when the load touches the ground, sensors 58, 60 casue the computer to reduce power to the jet engine or engines until the entire load is released, at which time the jet engine or engines remain in an idling condition. The cable connection to the load may be disengaged at this time and the platform lowered to the ground if so desired.

While I have shown and described plural embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A system for carrying a load from an aircraft, said system comprising:
    a platform suspended beneath said aircraft in flight with said aircraft being in weight carrying relation thereto wherein said platform is adapted to be lifted off the ground by said aircraft,
    means for connecting a load to said platform,
    an engine carried by said platform for lifting at least a major portion of the said load connected to said platform,
    and means for controlling said engine to provide immediate regulation of the thrust of said engine for continuously supplying less lift than would lift said engine, said platform and said load independently of said aircraft, so at least part of the load is carried by said aircraft.

2. The system according to claim 1 wherein said aircraft comprises a helicopter.

3. The system according to claim 1 wherein said aircraft comprises a balloon.

4. A system for lifting a load beneath an aircraft wherein said load is greater in magnitude than it is desired to lift with said aircraft, said system comprising:
    an engine for producing thrust in a vertical direction and means supporting said engine underneath said aircraft at a spaced location from said aircraft, said engine and said supporting means having a total weight within the load carrying capability of said aircraft so that the engine and the supporting means therefor can be lifted by said aircraft,
    means for attaching said load to the supporting means for said engine,
    and means for controlling said engine to provide thrust for lifting at least a major portion of said load with immediate regulation of the thrust of said engine for continuously supplying less lift than would lift said engine, said supporting means and said load independently of said aircraft, so at least a part of the total load is carried by said aircraft.

5. A system for increasing the load carrying capability of an aircraft, said system comprising:
    a platform provided with aircraft engine means mounted for producing thrust in a vertical direction from said platform,
    first support means for suspending said platform underneath said aircraft,
    a weight sensor for detecting the load presented to said first support means by said platform,
    second support means for attaching a load to said platform,
    and means responsive to the operation of said sensor for controlling said aircraft engine means to provide sufficient thrust for lifting at least a substantial portion of the weight of said load attached to said platform.

6. The system according to claim 5 wherein said aircraft engine means comprises a jet engine and said platform comprises a support structure for said engine including a plurality of legs for positioning said engine means on the ground and having means for connection to said first support means as well as means for connection to said second support means.

7. The system according to claim 6 further including emergency shutdown cover means for said jet engine for limiting operation thereof to prevent the production of excessive thrust therefrom under emergency conditions.

8. The system according to claim 5 wherein said first and second support means respectively comprise cable means extending between said aircraft and said platform, and extending between said platform and said load.

9. The system according to claim 5 wherein said aircraft engine means includes at least one lift fan empowered for lifting said platform off the ground, and further including legs for supporting the platform on the ground, means for connecting said platform to said first support means, and means for connecting said platform to said second support means.

10. The system according to claim 9 further including emergency shutdown cover means for said lift fan for limiting operation thereof to prevent the production of excessive thrust therefrom under emergency conditions.

11. The system according to claim 5 wherein said weight sensor comprises at least one strain sensing device connecting said first support means to said platform.

12. A method of carrying a suspended load from an aircraft beyond the normally desired load carrying capabilities of said aircraft, in a system including an engine carrying platform, said method comprising:
    supporting said engine carrying platform from beneath said aircraft such that said aircraft supports at least the major portion of the weight of the platform and engine,
    supporting a further load from said platform,
    and operating said engine to provide thrust in a substantially vertical direction for lifting at least a major portion of said further load with immediate regulation of the thrust of said engine for continuously supplying less lift than would lift said platform, engine and further load independently of said aircraft, so at least part of the total load is carried by said aircraft.

13. The method of lifting a load with an aircraft included in a system comprising an intermediate platform between said aircraft and said load wherein said platform is provided with an engine for supplying thrust in a substantially vertical direction, said method comprising:
    lifting said platform off the ground by said aircraft in suspended relation beneath said aircraft,
    raising said platform to a position of tension between said aircraft and said load whereby the engine on said platform is in a position for providing lift to the load,
    and bringing said engine on said platform up to power for lifting at least a major portion of said load in a substantially vertically upward direction from ground level.

* * * * *